(12) United States Patent
Sodagar

(10) Patent No.: US 11,451,869 B2
(45) Date of Patent: Sep. 20, 2022

(54) 5G MEDIA STREAMING NETWORK CAPABILITY DISCOVERY AND EXPRESSION

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/082,717

(22) Filed: Oct. 28, 2020

(65) Prior Publication Data
US 2021/0344998 A1    Nov. 4, 2021

Related U.S. Application Data

(60) Provisional application No. 63/001,996, filed on Mar. 30, 2020.

(51) Int. Cl.
*H04N 7/173* (2011.01)
*H04N 21/442* (2011.01)
*H04N 21/437* (2011.01)

(52) U.S. Cl.
CPC ..... *H04N 21/44245* (2013.01); *H04N 21/437* (2013.01)

(58) Field of Classification Search
CPC ................ H04N 21/44245; H04N 21/437
See application file for complete search history.

(56) References Cited

U.S. PATENT DOCUMENTS

| 2016/0219093 | A1* | 7/2016 | Gangadharan | ...... H04L 65/1069 |
| 2017/0317894 | A1* | 11/2017 | Dao | ................... H04L 41/5009 |
| 2019/0037409 | A1* | 1/2019 | Wang | ...................... H04W 8/08 |
| 2020/0100080 | A1* | 3/2020 | Mladin | ................. H04W 48/18 |

FOREIGN PATENT DOCUMENTS

WO    WO-2020014214 A1 *  1/2020  ............ H04L 67/16

OTHER PUBLICATIONS

"3rd Generation Partnership Project; Technical Specification Group Services and System Aspects; 5G Media Streaming (5GMS); General description and architecture (Release 16)", 3GPP TS 26.501 V16.3.1, Mar. 2020, 63 pages.

* cited by examiner

*Primary Examiner* — Mulugeta Mengesha
(74) *Attorney, Agent, or Firm* — Sughrue Mion, PLLC

(57) ABSTRACT

Systems and methods for media processing and streaming is provided, a method is performed by at least one processor for managing capabilities of a media streaming network. The method includes receiving a capability request from an external application server: transmitting an internal capability request to at least one streaming application server; receiving capability information from the at least one streaming application server; creating a capability list based on the capability information; and transmitting the capability list to the external application server.

20 Claims, 6 Drawing Sheets

5G MEDIA STREAMING NETWORK CAPABILITY DISCOVERY AND EXPRESSION

CROSS-REFERENCE TO RELATED APPLICATION

This application claims priority from U.S. Provisional Application No. 63/001,996, filed on Mar. 30, 2020, in the United States Patent and Trademark Office, the disclosure of which is incorporated herein by reference in its entirety.

FIELD

Embodiments of this disclosure are directed to media processing and streaming methods and systems, more particularly to discovery of network processing capabilities of 5G networks by external application servers, which allows the external application servers to learn about the current capabilities of the 5G network before requesting to set up any network-based processing.

BACKGROUND

Network and cloud platforms are used to run various applications. However, there is no standard based solution to describe the characteristics of a network or cloud platform or its elements.

3rd Generation Partnership Project (3GPP) TS26.501 defines the workflow for external application servers to establish network processing in 5G networks for uplink and downlink streaming applications.

The current 5GSMA design does not include the capability discovery. For any external application server to request a network processing workflow from the 5G network, it must learn about the capabilities of the network. Since the network may have different number workflows at any time, the network capabilities are often not static and must be measured at the time of the request.

SUMMARY

According to one or more embodiments, a method performed by at least one processor for managing capabilities of a media streaming network is provided. The method includes: receiving a capability request from an external application server: transmitting an internal capability request to at least one streaming application server; receiving capability information from the at least one streaming application server; creating a capability list based on the capability information; and transmitting the capability list to the external application server.

According to one or more embodiments, device for managing a media system is provided. The device includes: at least one processor; and memory comprising computer code, the computer code including: first receiving code configured to cause the at least one processor to receive a capability request from an external application server; first transmitting code configured to cause the at least one processor to transmit an internal capability request to at least one streaming application server; second receiving code configured to cause the at least one processor to receive capability information from the at least one streaming application server; creating code configured to cause the at least one processor to create a capability list based on the capability information; and second transmitting code configured to cause the at least one processor to transmit the capability list to the external application server.

According to one or more embodiments, a non-transitory computer-readable medium storing computer code is provided. The computer code is configured to, when executed by at least one processor for managing capabilities of a media streaming network, cause the at least one processor to: receive a capability request from an external application server; transmit an internal capability request to at least one streaming application server; receive capability information from the at least one streaming application server; create a capability list based on the capability information: and transmit the capability list to the external application server.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
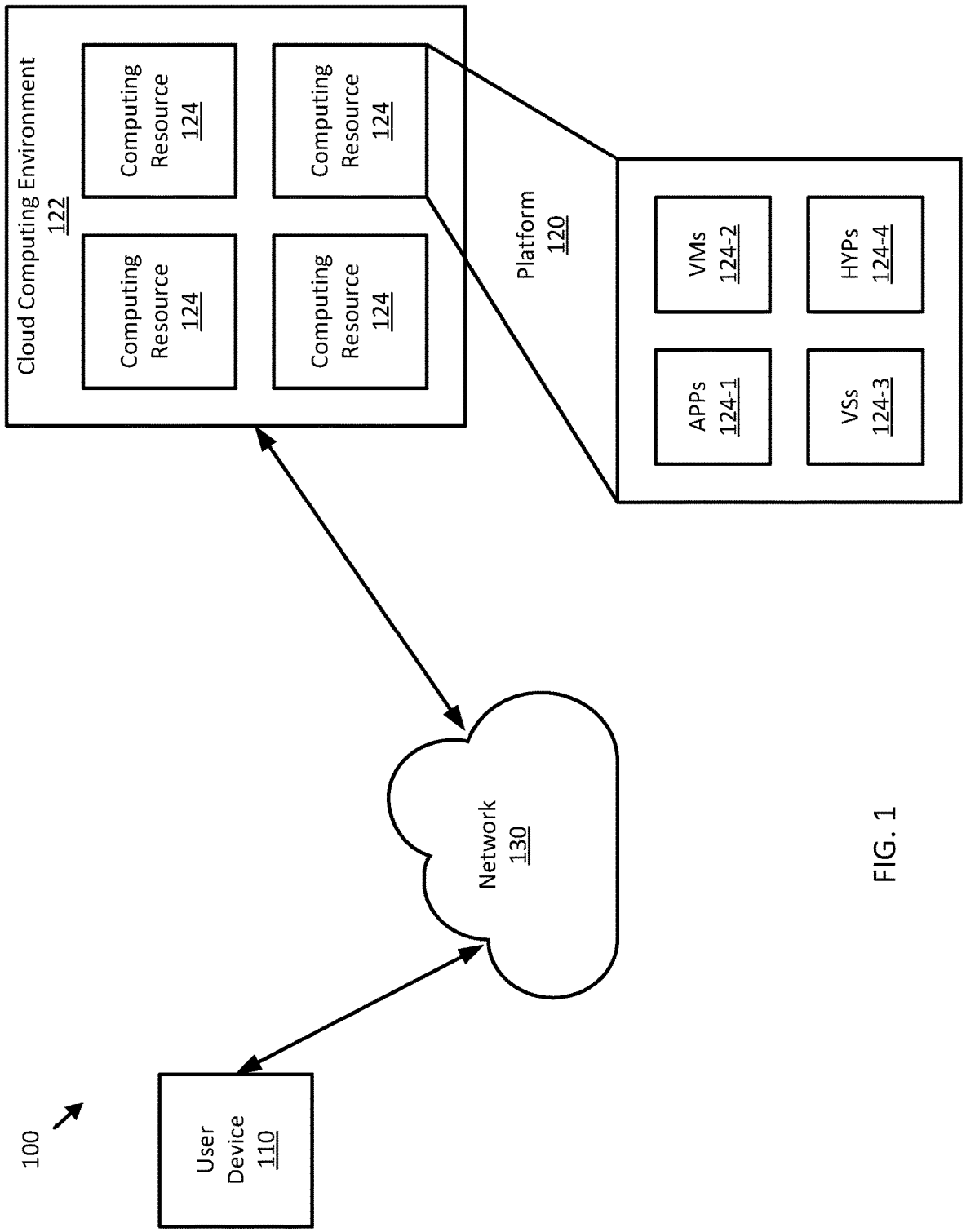
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
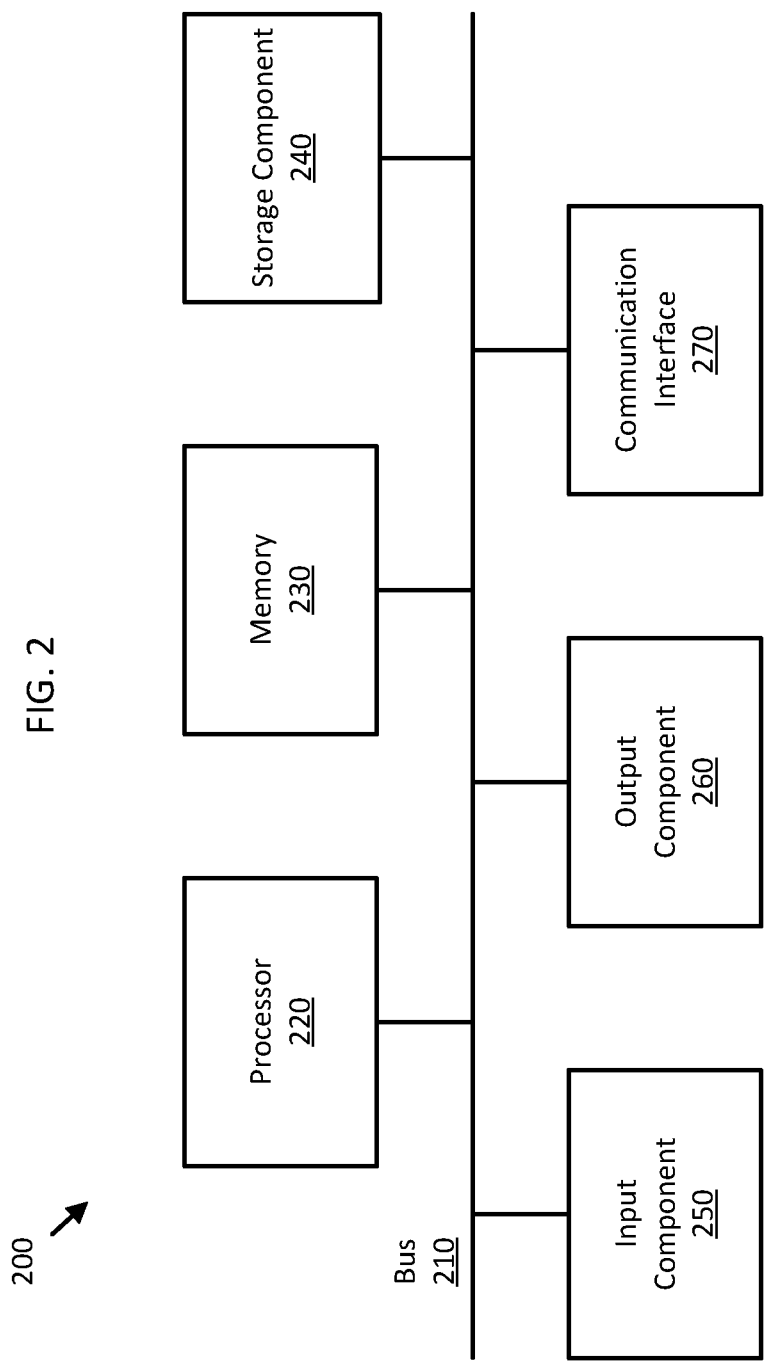
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
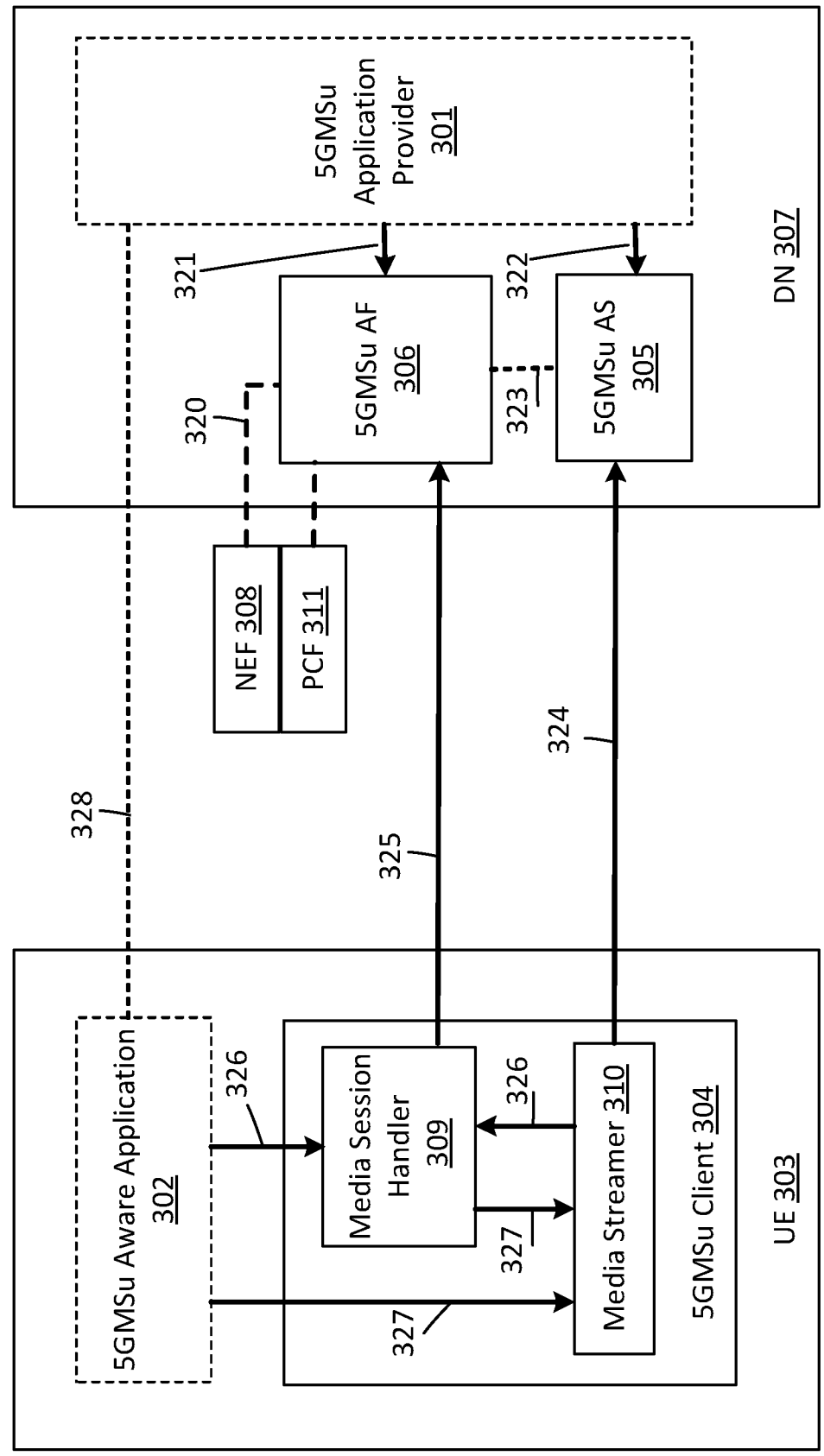
FIG. 3 is a block diagram of a media architecture for media uplink streaming, according to embodiments.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 303 by implementing external application or content service provider specific logic and enabling the establishment of a media session. 5GMSu AS 305 may host 5G media functions. 5GMSu Application Provide 301 may be an external application or content specific media functionality. e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interface. For example, link 321 may relate to M1$u$, which may be a 5GMSu Provisioning API exposed by 5GMSu AF 306 to provision usage of media architecture 300 and to obtain feedback. Link 322 may relate to M2$u$, which may be a 5GMSu Publish API exposed by 5GMSu AS 305 and used when 5GMSu AS 305 in trusted DN, such as DN 307, is selected to receive content for streaming service. Link 323 may relate to M3$u$, which may be an internal API used to exchange information for content hosting on 5GMSu AS 305 within a trusted DN such as DN 307. Link 324 may relate to M4$u$, which may be a Media Uplink Streaming API exposed by 5GMSu AS 323 to Media Streamer 310 to stream media content. Link 325 may relate to M5$u$, which may be a Media Session Handling API exposed by 5GMSu AF 305 to Media Session Handler for media session handling, control and assistance that also include appropriate security mechanisms e.g. authorization and authentication. Link 326 may relate to M6$u$, which may be a UE 303 Media Session Handling API exposed by Media Session Handler 309 to 5GMSu Aware Application 302 to make use of 5GMSu functions. Link 327 may relate to M7$u$, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

Figure 4:
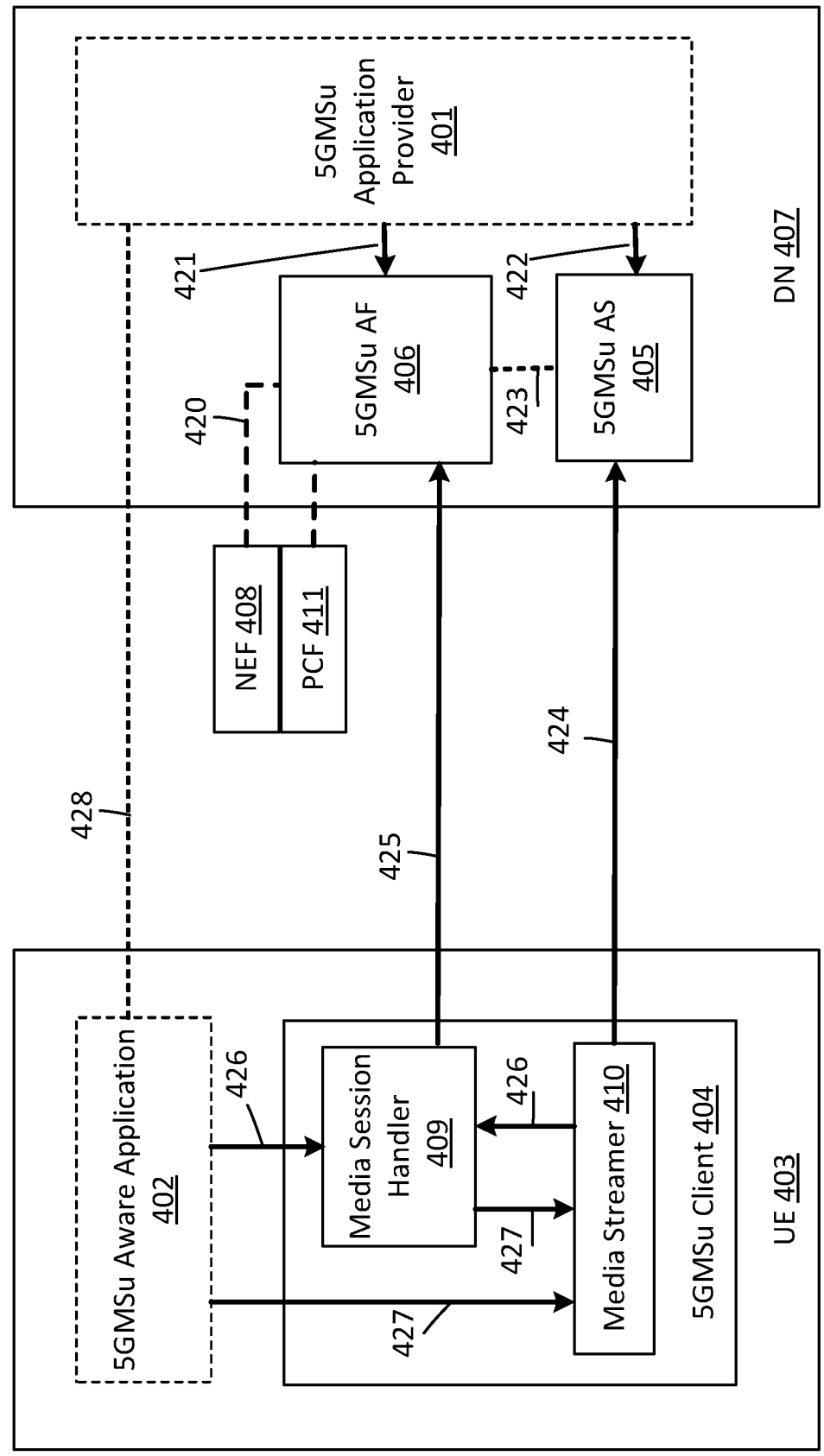
FIG. 4 is a block diagram of a media architecture 400 for media uplink streaming, according to embodiments.

FIG. 4 is a diagram of a media architecture 400 for media downlink streaming. A 5G media streaming downlink (5GMSd) Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd Application Server (AS) may be an AS dedicated to 5G Media Downlink Streaming. 5GMSd Client 404 may be a UE 403 internal function dedicated to 5G Media Downlink Streaming.

5GMSd Application Function (AF) 406 and 5GMSd AS 405 may be Data Network (DN) 407 functions. Functions in trusted DNs may be trusted by the operator's network. Therefore. AFs in trusted DNs may directly communicate with all 5G Core functions. Functions in external DNs may only communicate with 5G Core functions via the Network Exposure Function (NEF) 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 403 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different Policy or Charging Function (PCF) 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Embodiments may relate to a workflow and procedure to discover the capabilities of the 5G network by the external entities. However, before establishing the media processing, an external Media AS must learn about the media processing capabilities of the mobile network operation (MNO) network. These capabilities may include:

1. Available hardware resources including processing units, storage, and network elements
2. The throughput and delay range that network can provide
3. The media processing function libraries, the functional description and input/output formats of the various functions such as
   a. Encoding, transcoding and multi-rate encoding into different formats
   b. Manifest generation
   c. Encryptions and content protection
   d. Content replacement such as ad insertion
   e. Added media such as closed caption, object detection, content filtering The MNO network resources may vary in different regions and also the availability of resources varies depending on the current load on the network. Therefore, the MNO network must measure the availability of resources at the time of request and the capabilities might not be prepared ahead of time in deployments.

Figure 5:
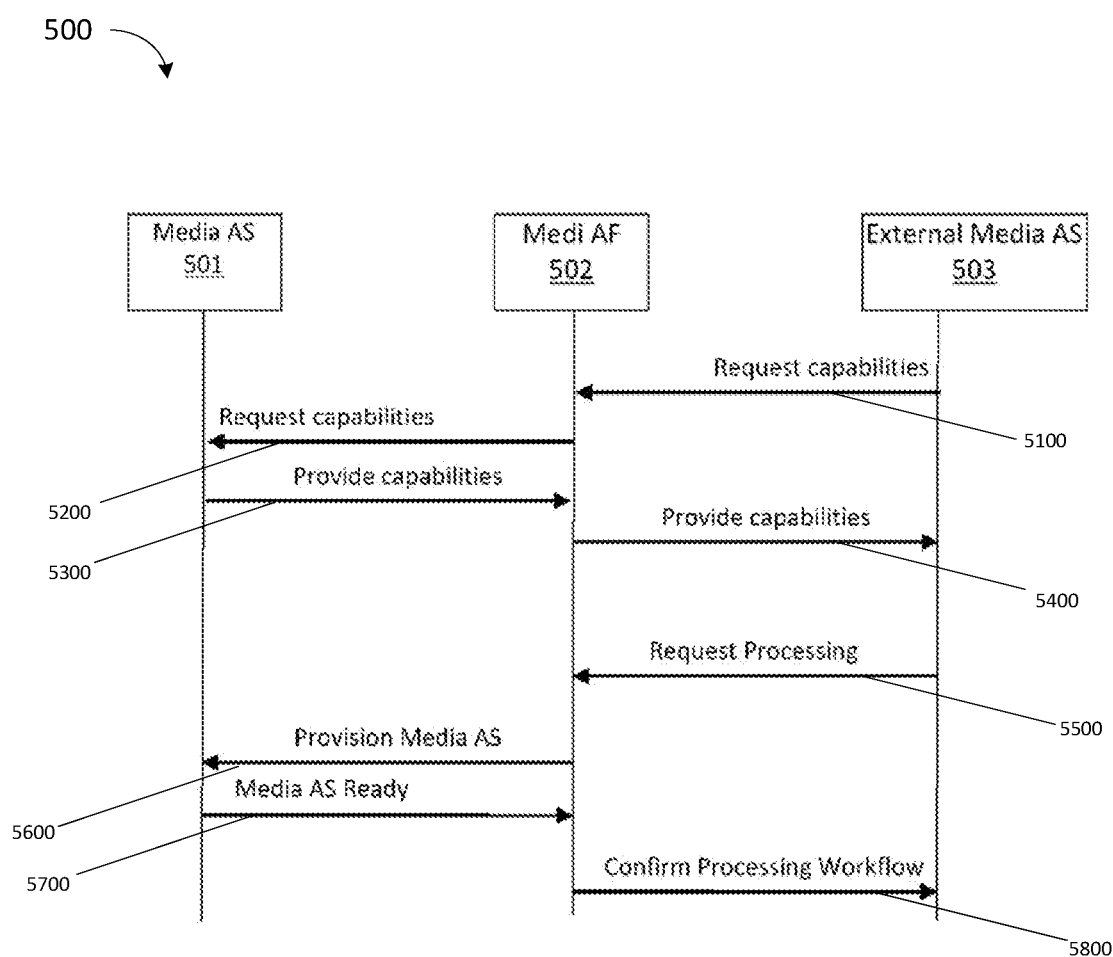
FIG. 5 is a block diagram demonstrating an example of a workflow between an external application server and media Streaming Application Functions and application servers, according to embodiments.

FIG. 5 is a block diagram demonstrating an example of a workflow 500 between an external application server, for example external media AS 503, and Media Streaming Application Functions and Application Servers, for example media AS 501 and media AF 502. In embodiments, media AS 501 may correspond to, for example, 5GMSu AS 305 and/or 5GMSd AS 405. In embodiments, media AF 502 may correspond to, for example, 5GMSu AF 306 and/or 5GMSd AF 406.

According to workflow 500, at operation 5100 external media AS 503 may request media processing capabilities. At operation 5200, media AF 502 may request the existing hardware resources from at least one media AS 501. In embodiments, the responses from the at least one media AS 501 may vary depending on the availability of the resources at the moment of the request. In embodiments, the responses may be in an internal format, or included in a Capabilities Description Document (CDD). At operation 5300, the media AF 502 collects the media AS 501 responses, adds functional support and creates a total capability list. At operation 5400, media AF 502 and sends the total capability list to external media AS 503.

In embodiments, workflow 500 may also include, operation 5500, in which external media AS 503 may request processing from media AF 502. At operation 5600, media AF 502 may provision at least one media AS 501. At operation 5700, the at least one media AF 501 may report readiness. At operation 5800, media AF 502 may confirm a processing workflow with external media AS 503.

In embodiments, the following information may be included in the network capabilities:
1. List of available function libraries and their characteristics
2. List of pre-built media processing workflows
3. Hardware resources bounds and maximum throughput Table 1 shows a set of descriptors for describing the network capabilities. Table 1 may, for example, correspond to the Moving Picture Experts Group (MPEG) Network Based Media Processing (NBMP) standard.

TABLE 1

| Capabilities Description (CD) | | |
| --- | --- | --- |
| Descriptor | Additional constraints | Cardinality |
| Scheme | An urn for identifying this specific set of capabilities | 0-1 |
| General | Network Name Subnetwork Name Description Date/time of publication Security and access requirements | 1 |
| Repository | List of the supported function repositories | 0-1 |
| Functions | List of the function descriptions | 0-1 |
| Requirements | Flow control capabilities Hardware capabilities Security capabilities | 0-1 |
| Failover | Describes the failover support | 0-1 |
| Cardinality: 1 = exactly one, 0-1 = zero or one | | |

Each row in Table 1 may be a descriptor. Each descriptor may include of a set of parameters or a set of objects of parameters. Each parameter has a precise definition, a data type, a unit, and a range. The characteristic of the network capabilities can be described using these descriptors.

As shown in Table 1, the repository descriptor lists the supported repositories. Each repository includes a list of supported functions. Alternatively, the function description can be included in Capabilities Description as an array of Function Descriptions.

Therefore, the list of supported functions and their characteristics can be retrieved. These characteristics may include:
1. Supported input formats, codecs, and codec profiles/levels, resolutions, frame rates
2. Transcoding with formats, output codecs, codec profiles/levels, bitrates, and others
3. Reformatting with output format,
4. Combination of input media streams, e.g. network-based stitching, mixing,
5. Recognition or synthesis of media In embodiments, a Capabilities Description Document (CDD) may be a document containing Capabilities Description JavaScript Object Notation (JSON) objects. In embodiments, a Capabilities Resource (CR) may be a representational (REST) resource that contains a CDD.

Embodiments may relate to a method for discovering 5G network capabilities by external application servers, and a workflow wherein the 5G network gathers the currently available resources from various media servers and describes the total capabilities to the external application server.

Embodiments may relate to a method of describing 5G network capabilities to the external application servers, wherein the capabilities are described as a set of descriptors, wherein each descriptor includes multiple parameters which describe the characteristics of the network including the throughput and delay capabilities, processing, storage and network capabilities, the list, and description of supported function repositories and functions Embodiments may relate to a method of using a description document using REST APIs to exchange information between the 5G application functions and the external application servers.

Figure 6:
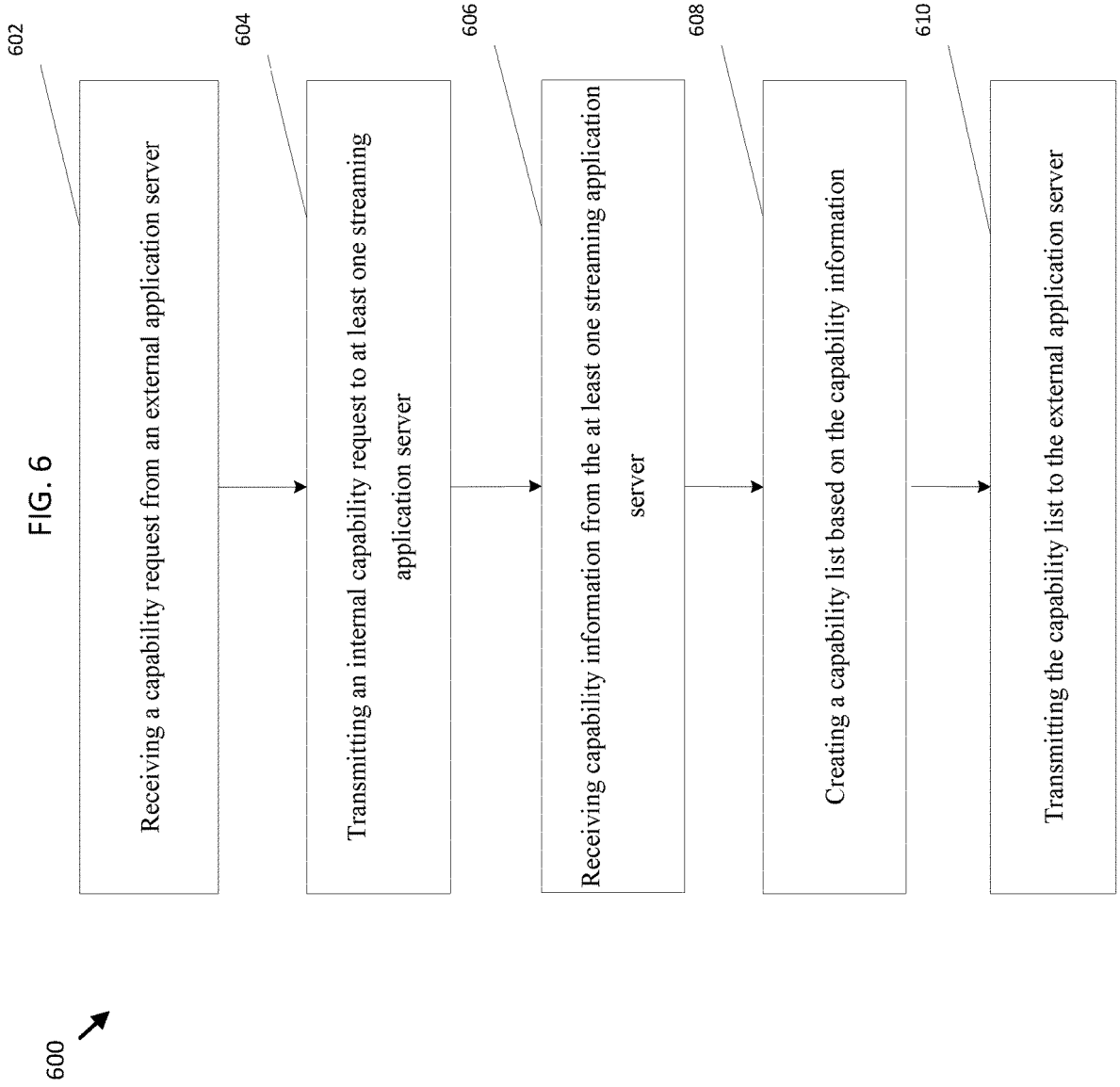
FIG. 6 is a flowchart of an example process for managing capabilities of a media streaming network, according to embodiments.

FIG. 6 is a flowchart is an example process 600 for decoding an encoded video bitstream. In some implementations, one or more process blocks of FIG. 6 may be performed by media AF 502. In some implementations, one or more process blocks of FIG. 6 may be performed by another device or a group of devices separate from or including media AF 502, such as 5GMSu AF 306, 5GMSd AF 406, or other elements of DN 307 and DN 407.

As shown in FIG. 6, process 600 may include receiving a capability request from an external application server (block 602). In embodiments, the external application server may correspond to external media AS 503.

As further shown in FIG. 6, process 600 may include transmitting an internal capability request to at least one streaming application server (block 604). In embodiments, the at least one streaming application server may correspond to at least one of media AS 501, 5GMSu AS 305, or 5GMSd AS 405.

As further shown in FIG. 6, process 600 may include receiving capability information from the at least one streaming application server (block 606).

As further shown in FIG. 6, process 600 may include creating a capability list based on the capability information (block 608).

As further shown in FIG. 6, process 600 may include transmitting the capability list to the external application server (block 610).

In embodiments, the capability information may indicate media streaming capabilities of the at least one streaming server at time when the at least one streaming server receives the internal capability request.

In embodiments, the streaming capabilities may relate to at least one of available hardware resources, a current throughput, an current delay range, available media processing function libraries, functional descriptions of one or more functions, and characteristics of the one or more functions.

In embodiments, the one or more functions may include at least one of manifest generation, encryption, content protection, content replacement, closed captioning, object detection, and content filtering.

In embodiments, the characteristics of the one or more functions may include supported input formats, codecs, codec profiles, codec levels, resolutions, frame rates, transcoding formats, bitrates, stitching characteristics, mixing characteristics, media recognition characteristics, and media synthesis characteristics.

In embodiments, the capability information may be received from the at least one streaming server in at least one of an internal format, or a capabilities description document.

In embodiments, the capability list may be transmitted to the external application server as a set of capability descriptors.

In embodiments, the set of capability descriptors may be included in a capabilities description document.

In embodiments, the capabilities description document may be included in a capabilities resource.

Although FIG. 6 shows example blocks of process 600, in some implementations, process 600 may include additional blocks, fewer blocks, different blocks, or differently arranged blocks than those depicted in FIG. 6 Additionally, or alternatively, two or more of the blocks of process 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has." "have," "having," or the like are intended to be open-ended terms. Further, the phrase "based on" is intended to mean "based, at least in part, on" unless explicitly stated otherwise.

What is claimed is:

1. A method of managing capabilities of a media streaming network using at least one processor, the method comprising:
   receiving, by an application function included in the media streaming network, a media streaming capability request from an external application server;
   transmitting, by the application function, an internal media streaming capability request to at least one streaming application server included in the network;
   receiving, by the application function, media streaming capability information from the at least one streaming application server;
   creating, by the application function, a media streaming capability list based on the media streaming capability information; and
   transmitting, by the application function, the media streaming capability list to the external application server,
   wherein the at least one streaming application server is separate from the application function.

2. The method of claim 1, wherein the media streaming capability information indicates media streaming capabilities of the at least one streaming application server at time when the at least one streaming application server receives the internal media streaming capability request.

3. The method of claim 2, wherein the media streaming capabilities relate to at least one of available hardware resources, a current throughput, an current delay range, available media processing function libraries, functional descriptions of one or more functions, and characteristics of the one or more functions.

4. The method of claim 3, wherein the one or more functions includes at least one of manifest generation, encryption, content protection, content replacement, closed captioning, object detection, and content filtering.

5. The method of claim 3, wherein the characteristics of the one or more functions include supported input formats, codecs, codec profiles, codec levels, resolutions, frame rates, transcoding formats, bitrates, stitching characteristics, mixing characteristics, media recognition characteristics, and media synthesis characteristics.

6. The method of claim 1, wherein the media streaming capability information is received from the at least one streaming application server in at least one of an internal format, or a capabilities description document.

7. The method of claim 1, wherein the media streaming capability list is transmitted to the external application server as a set of capability descriptors.

8. The method of claim 7, wherein the set of capability descriptors is included in a capabilities description document.

9. The method of claim 8, wherein the capabilities description document is included in a capabilities resource.

10. A device for managing capabilities of a media streaming network, the device comprising:
    at least one memory configured to store program code; and
    at least one processor configured to read the program code and operate as instructed by the program code, the program code including:
    first receiving code configured to cause the at least one processor to receive, by an application function included in the media streaming network, a media streaming capability request from an external application server;
    first transmitting code configured to cause the at least one processor to transmit, by the application function, an internal media streaming capability request to at least one streaming application server included in the network;
    second receiving code configured to cause the at least one processor to receive, by the application function, media streaming capability information from the at least one streaming application server;
    creating code configured to cause the at least one processor to create, by the application function, a media streaming capability list based on the media streaming capability information; and second transmitting code configured to cause the at least one processor to transmit, by the application function, the media streaming capability list to the external application server, wherein the at least one streaming application server is separate from the application function.

11. The device of claim 1, wherein the media streaming capability information indicates media streaming capabilities of the at least one streaming application server at time when the at least one streaming application server receives the internal media streaming capability request.

12. The device of claim 11, wherein the media streaming capabilities relate to at least one of available hardware resources, a current throughput, an current delay range, available media processing function libraries, functional descriptions of one or more functions, and characteristics of the one or more functions.

13. The device of claim 12, wherein the one or more functions includes at least one of manifest generation, encryption, content protection, content replacement, closed captioning, object detection, and content filtering.

14. The device of claim 12, wherein the characteristics of the one or more functions include supported input formats, codecs, codec profiles, codec levels, resolutions, frame rates, transcoding formats, bitrates, stitching characteristics, mixing characteristics, media recognition characteristics, and media synthesis characteristics.

15. The device of claim 10, wherein the media streaming capability information is received from the at least one streaming application server in at least one of an internal format, or a capabilities description document.

16. The device of claim 10, wherein the media streaming capability list is transmitted to the external application server as a set of capability descriptors.

17. The device of claim 16, wherein the set of capability descriptors is included in a capabilities description document.

18. The device of claim 17, wherein the capabilities description document is included in a capabilities resource.

19. A non-transitory computer-readable medium storing instructions, the instructions comprising: one or more instructions that, when executed by one or more processors of a device for managing capabilities of a media streaming network, cause the one or more processors to:

receive, by an application function included in the media streaming network, a media streaming capability request from an external application server;

transmit, by the application function, an internal media streaming capability request to at least one streaming application server included in the network;

receive, by the application function, media streaming capability information from the at least one streaming application server;

create, by the application function, a media streaming capability list based on the media streaming capability information; and transmit, by the application function, the media streaming capability list to the external application server, wherein the at least one streaming application server is separate from the application function.

20. The non-transitory computer-readable medium of claim 19, wherein the media streaming capability list is transmitted to the external application server as a set of capability descriptors, wherein the set of capability descriptors is included in a capabilities description document, and wherein the capabilities description document is included in a capabilities resource.

* * * * *